US009197563B2

(12) United States Patent
Chrysos et al.

(10) Patent No.: US 9,197,563 B2
(45) Date of Patent: Nov. 24, 2015

(54) BYPASSING CONGESTION POINTS IN A CONVERGED ENHANCED ETHERNET FABRIC

(71) Applicant: International Business Machines Corporation, Armonk, NY (US)

(72) Inventors: Nikolaos Chrysos, Thalwil (CH); Daniel Crisan, Adliswil (CH); Casimer M. DeCusatis, Poughkeepsie, NY (US); Mircea Gusat, Langnau (CH); Cyriel J. Minkenberg, Gutenswil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/501,491

(22) Filed: Sep. 30, 2014

(65) Prior Publication Data

US 2015/0078170 A1 Mar. 19, 2015

Related U.S. Application Data

(63) Continuation of application No. 13/834,455, filed on Mar. 15, 2013.

(51) Int. Cl.
*H04L 12/803* (2013.01)
*H04L 12/835* (2013.01)
*H04L 12/931* (2013.01)
(Continued)

(52) U.S. Cl.
CPC ............ *H04L 47/122* (2013.01); *H04L 47/115* (2013.01); *H04L 47/17* (2013.01); *H04L 47/2483* (2013.01); *H04L 47/30* (2013.01); *H04L 47/6255* (2013.01);
(Continued)

(58) Field of Classification Search
None
See application file for complete search history.

(56) References Cited

U.S. PATENT DOCUMENTS 6,901,053 B1  5/2005  Davies
7,706,353 B2  4/2010  Roy
(Continued)

FOREIGN PATENT DOCUMENTS

CN   102025617 A    4/2011
JP   2011146982 A   7/2011
WO   2011065268 A1  3/2011

OTHER PUBLICATIONS

Minkenberg et al., "Adaptive Routing for Convergence Enhanced Ethernet", HPSR'09 Proceedings of 15th International Conference on High Performance Switching & Routing, Nov. 3, 2009, 8 pages.*
(Continued)

*Primary Examiner* — Jae Y Lee
*Assistant Examiner* — Andrew Oh
(74) *Attorney, Agent, or Firm* — Cantor Colburn LLP; Steven Chiu

(57) ABSTRACT

Embodiments relate to bypassing congestion points in a network. An aspect includes sampling queues of a plurality of switches in a network. When packet congestion is detected at a congestion point of a first switch, the packet flow contributing to the packet congestion is identified. A congestion notification message indicating the identified packet flow is then propagated to upstream switches, which are upstream from the first switch in the network. The congestion notification message is then snooped by the upstream switches. Virtual queues within the upstream switches are associated with the identified packet flow to hold packets associated with the identified packet flow. The packets associated with the identified packet flow are then re-routed to bypass the packet congestion in the first switch.

12 Claims, 5 Drawing Sheets

(51) Int. Cl.
*H04L 12/851* (2013.01)
*H04L 12/863* (2013.01)
*H04L 12/801* (2013.01)

(52) U.S. Cl.
CPC ........... *H04L 49/501* (2013.01); *H04L 49/506* (2013.01); *H04L 47/18* (2013.01); *H04L 47/193* (2013.01)

(56) References Cited

U.S. PATENT DOCUMENTS

| | | | |
|---|---|---|---|
| 7,756,959 B1* | 7/2010 | Beshai et al. | 709/223 |
| 7,782,793 B2 | 8/2010 | Olesinski et al. | |
| 7,787,367 B2 | 8/2010 | Gusat et al. | |
| 7,830,793 B2* | 11/2010 | Gai et al. | 370/230 |
| 7,873,441 B2 | 1/2011 | Synesiou et al. | |
| 7,957,293 B2 | 6/2011 | Mayhew | |
| 8,054,744 B1* | 11/2011 | Bishara et al. | 370/229 |
| 8,059,532 B2 | 11/2011 | Riddle et al. | |
| 8,089,884 B2 | 1/2012 | Liu | |
| 8,174,978 B2 | 5/2012 | Naven et al. | |
| 8,189,479 B1 | 5/2012 | Doherty et al. | |
| 2002/0095493 A1 | 7/2002 | Byrnes | |
| 2006/0056308 A1 | 3/2006 | Gusat et al. | |
| 2008/0049746 A1 | 2/2008 | Morrill et al. | |
| 2008/0062879 A1* | 3/2008 | Sivakumar et al. | 370/235 |
| 2008/0080504 A1* | 4/2008 | Gusat et al. | 370/392 |
| 2008/0273465 A1 | 11/2008 | Gusat et al. | |
| 2008/0282058 A1* | 11/2008 | Maher et al. | 712/7 |
| 2009/0135729 A1 | 5/2009 | Saffre | |
| 2009/0234908 A1* | 9/2009 | Reyhner et al. | 709/203 |
| 2009/0238070 A1 | 9/2009 | Rivers et al. | |
| 2009/0279433 A1* | 11/2009 | Briscoe et al. | 370/235 |
| 2009/0300209 A1 | 12/2009 | Elzur | |
| 2011/0035498 A1* | 2/2011 | Shah et al. | 709/226 |
| 2011/0158091 A1* | 6/2011 | Sun et al. | 370/230 |
| 2011/0164496 A1 | 7/2011 | Loh et al. | |
| 2011/0176423 A1 | 7/2011 | Chowdhury et al. | |
| 2011/0255402 A1 | 10/2011 | Fourcand | |
| 2011/0261722 A1 | 10/2011 | Awano et al. | |
| 2011/0261723 A1 | 10/2011 | Yamato et al. | |
| 2011/0261831 A1 | 10/2011 | Sharma et al. | |
| 2011/0273988 A1 | 11/2011 | Tourrilhes et al. | |
| 2011/0285516 A1 | 11/2011 | Ritter | |
| 2011/0286324 A1 | 11/2011 | Bellagamba et al. | |
| 2011/0299389 A1 | 12/2011 | Mau et al. | |
| 2012/0020219 A1 | 1/2012 | Kamiya et al. | |
| 2012/0140626 A1* | 6/2012 | Anand et al. | 370/235 |
| 2012/0151472 A1* | 6/2012 | Koch et al. | 718/1 |
| 2012/0155256 A1* | 6/2012 | Pope et al. | 370/230 |
| 2012/0163178 A1* | 6/2012 | Gordon et al. | 370/237 |
| 2013/0155850 A1* | 6/2013 | Chrysos et al. | 370/230 |
| 2013/0155857 A1* | 6/2013 | Chrysos et al. | 370/235 |
| 2013/0155858 A1* | 6/2013 | Chen et al. | 370/235 |
| 2013/0294236 A1 | 11/2013 | Beheshti-Zavareh et al. | |
| 2014/0161135 A1* | 6/2014 | Acharya et al. | 370/412 |
| 2014/0241345 A1* | 8/2014 | DeCusatis et al. | 370/355 |
| 2014/0269274 A1* | 9/2014 | Banavalikar et al. | 370/230 |

OTHER PUBLICATIONS

Briscoe et al., "Tunnelling of Explicit Congestion Notification (RFC6040)", Terminal Disclosure, Nov. 1, 2010, 71 pages.

Crisan et al., "Comparative Evaluation of CEE-based Switch Adaptive Routing", IBM, 2010, pp. 1-12.

Crisan et al., "Short and Fat: TCP Performance in CEE Datacenter Networks", Proceedings of 2011 IEEE 19th Annual Symposium on High Performance Interconnects (HOTI 2011), pp. 43-50.

D. Papadimitriou, et al., "Open Research Issues in Internet Congestion Control", (RFC6077), IPCOM000203818D, IP.com Prior Art Database, Feb. 2011, pp. 1-103.

Dinu et al., "Inferring a Network Congestion Map with Zero Traffic Overhead", 2011 19th IEEE International Conference on Network Protocols (ICNP), pp. 69-78.

Gusat, et al., "R3C2: Reactive Route and Rate Control for CEE," 18th IEEE Symposium on HIgh Performance Interconnects, 2010, pp. 1-8.

Hagen et al., "Performance Evaluation of DCB's Priority-Based Flow Control", Proceedings 2011, IEEE 10th International Symposium on Network Computing & Applications (NCA 2011), pp. 328-333.

Hayashi et al., "Improving Fairness of Quantized Congestion Notification for Data Center Ethernet Networks", Proceedings of 2011 31st International Conference on Distributed Computing Systems Workshops (ICDCS Workshops), pp. 20-25, 2011.

IBM Systems and Technology, "Software Defined Networking: A New Paradigm for Virtual Dynamic, Flexible Networking" Thought Leadership White Paper, IBM, Oct. 2012, pp. 1-8.

M. Suchara et al "Network Architecture for Joint Failure, Recovery and Traffic Engineering", SIGMETRICS'11, ACM, Jun. 2011, pp. 1-12.

McKeown et al, "OpenFlow: Enabling Innovation in Campus Networks" ACM SIGCOMM Computer Communication Review Archive, vol. 38, Issue 2, 2008, pp. 1-6.

P. Devkota, et al "Performance of Quantized Congestion Notification in TCP Incast in Data Centers", 18th Annual IEEE/ACM International Symposium on Modeling, Analysis and Simulation of Computer and Telecommunication Systems, 2010, pp. 1-91.

Zhang et al "An Adaptive Congestion Control Strategy for Wireless Sensor Networks", 2011 International Conference on Information Technology, Computer Engineering and Management Services (ICM), 2, pp. 265-268.

Pfaff, et al. "OpenFlow Switch Specification," Version 1.1.0 Implemented (Wire Protocol 0x02), Feb. 28, 2011, pp. 1-56.

S. Lam, et al.,"An Experimental Study of the Congestion Control of Packet Communication Networks," IPCOM000152019D, IP.com Prior Art Database, Mar. 1980, pp. 1-55.

Tam et al., "Leveraging Performance of Multiroot Data Center Networks by Reactive Reroute," 2010 18th IEEE Symposium on High Performance Interconnects, IEEE Computer Society, 2010, pp. 66-74.

UK International Search Report and Written Opinion for International Application No. PCT/IB2014/059458; International Filing Date: Mar. 5, 2014; Date of mailing: Jun. 10, 2014; 6 pages.

Welzl et al, "Congestion Control in the RFC Series (RFC5783)", Technical Disclosure, Feb. 1, 2010, 57 pages.

U.S. Appl. No. 13/834,679; Non-Final Office Action; Date Filed: Mar. 15, 2013; Date Mailed: Mar. 19, 2015; 28 pages.

U.S. Appl. No. 13/834,455; Non-Final Office Action; Date Filed: Mar. 25, 2013; Date Mailed: Dec. 11, 2014; 44 pages.

U.S. Appl. No. 13/834,503; Non-Final Office Action; Date Filed: Mar. 15, 2013; Date Mailed: Apr. 27, 2015; 30 pages.

U.S. Appl. No. 14/501,908; Non-Final Office Action; Date Filed Sep. 30, 2014; Date Mailed: Apr. 28, 2015; 24 pages.

* cited by examiner

BYPASSING CONGESTION POINTS IN A CONVERGED ENHANCED ETHERNET FABRIC

DOMESTIC PRIORITY

This application is a continuation of U.S. patent application Ser. No. 13/834,455, filed Mar. 15, 2013, the content of which is incorporated by reference herein in its entirety.

BACKGROUND

The present invention relates to network congestion, and more specifically, to empowering switches upstream from the network congestion to proactively create virtual queues and re-route packet traffic to bypass downstream congestion points.

IEEE 802.1 data center bridging (DCB) Ethernet is often used as a primary physical network protocol in datacenters for computer-to-computer communications. In contrast to the modern 802.1Qau DCB (i.e., convergence enhanced Ethernet (CEE)/data center Ethernet (DCE)), the traditional Ethernet was typically designed to be a best-effort network and may experience network congestion. Network congestion occurs when a link or node is carrying so much data that its quality of service deteriorates. Typical effects include queueing delay, packet loss and/or the blocking of new connections. A consequence of packet loss or the blocking of new connections is that incremental increases in offered load only lead to small increases in network throughput or to an actual reduction in network throughput. Moreover, network congestion may lead to a congestive collapse at a choke point in the network, where the total incoming traffic to a node exceeds the outgoing bandwidth. When a network is in such a condition, there are high levels of packet delay and loss and general quality of network service is poor. These effects are aggravated in the modern multitenant datacenters using server and network virtualization on top of Layer 2 CEE fabrics with Priority Flow Control (PFC, 802.1Qbb), used for converged lossless traffic. Hence the need for Quantized Congestion Notification (QCN, 802.1 Qau), which is today built in most modern CEE switches and adapters, as well as being introduced in the new Virtual Overlays and software-defined networking (SDN) solutions.

SUMMARY

According to an embodiment of the present invention, a method for bypassing congestion points in a network is provided. The method includes sampling, by a processing device, queues of a plurality of switches in a network. When packet congestion is detected at a congestion point of a first switch, the packet flow contributing to the packet congestion is identified. A congestion notification message indicating the identified packet flow is then propagated to upstream switches, which are upstream from the first switch in the network. The congestion notification message is then snooped by the upstream switches. Virtual queues within the upstream switches are associated with the identified packet flow to hold packets associated with the identified packet flow. The packets associated with the identified packet flow are then re-routed to bypass the packet congestion in the first switch.

According to another embodiment of the present invention, a computer program product for bypassing congestion points in a network is provided. The computer program product includes a storage medium having computer-readable program code embodied thereon, which when executed by a computer processor, causes the computer processor to implement a method. The method includes sampling queues of a plurality of switches in a network. When packet congestion is detected at a congestion point of a first switch, the packet flow contributing to the packet congestion is identified. A congestion notification message indicating the identified packet flow is then propagated to upstream switches, which are upstream from the first switch in the network. The congestion notification message is then snooped by the upstream switches. Virtual queues within the upstream switches are associated with the identified packet flow to hold packets associated with the identified packet flow. The packets associated with the identified packet flow are then re-routed to bypass the packet congestion in the first switch.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
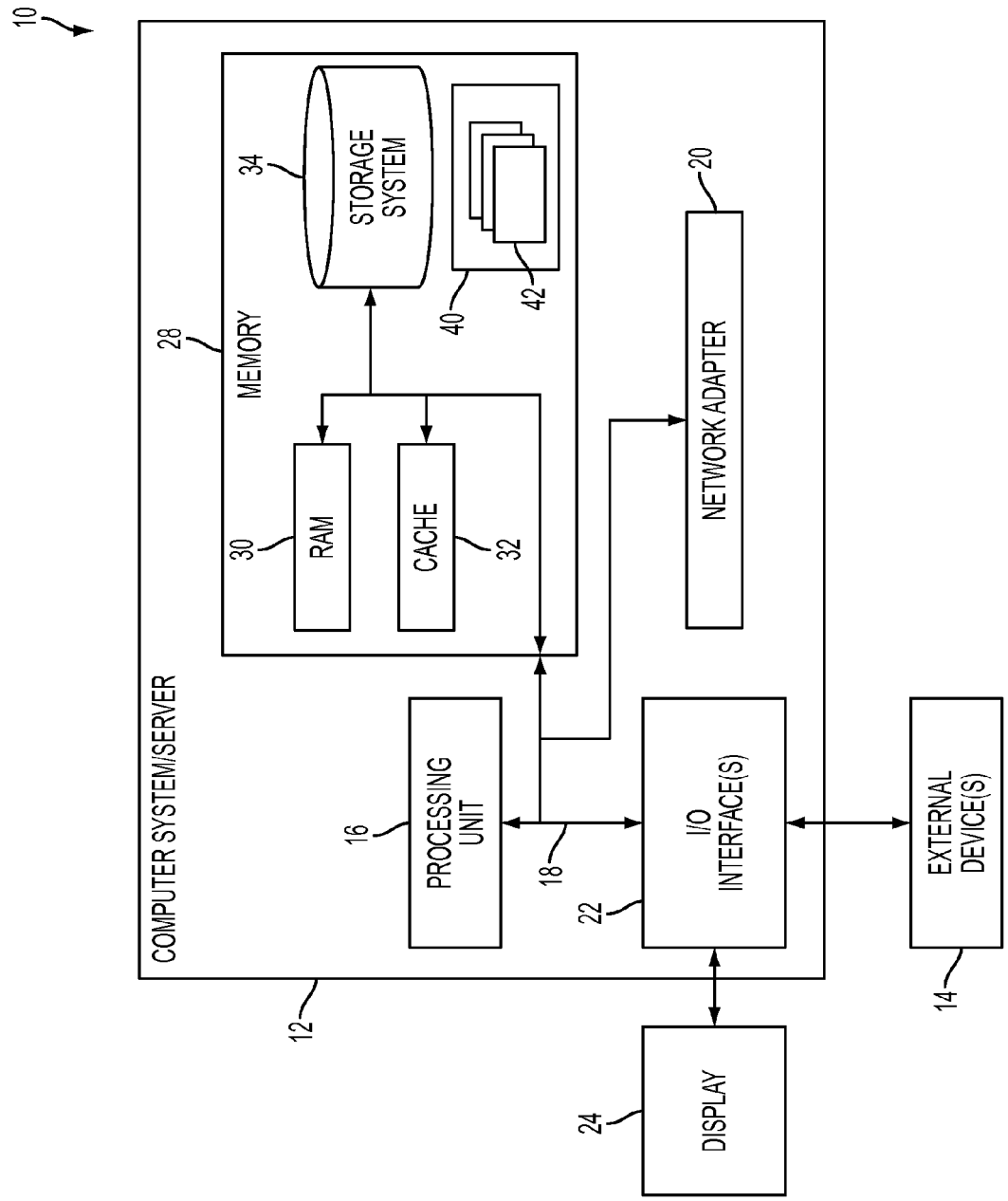
FIG. 1 depicts a cloud computing node according to an embodiment.

Embodiments disclosed herein detect and bypass network congestion in a lossless Ethernet network fabric. Embodiments provide switches located upstream from the network congestion with the ability to proactively create virtual queues and to re-route packet traffic to bypass downstream congestion points. This provides better throughput on the network and better performance for attached applications.

Typically, a switch at a congestion point in an input queue, an output queue, a shared buffer, or the like, in a network will transmit a congestion notification message to a source server. Upon receiving the congestion notification message, the source server will typically throttle down the data rate until the congestion dissipates. The switches upstream from the congestion point, however, are not aware of the downstream congestion points and have no role in reducing or bypassing congestion in the network.

Accordingly, embodiments disclosed herein provide the ability for switches upstream from the network congestion to snoop congestion notification messages, to proactively create virtual queues, and to re-route packet traffic, based on priority level, to bypass downstream congestion points. The created virtual queues of embodiments are therefore enabled in anticipation of congestion in the network and provide a virtual queue holding area to hold packets that would normally overflow.

It is understood in advance that although this invention includes a detailed description on cloud computing, implementation of the teachings recited herein are not limited to a cloud computing environment. Rather, embodiments of the invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of a cloud computing node for bypassing points of congestion in a Converged Enhanced Ethernet (CEE) network of an embodiment is shown. Cloud computing node 10 is only one example of a suitable cloud computing node and is not intended to suggest any limitation as to the scope of use or functionality of embodiments described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device, also referred to as a processing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 may include a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
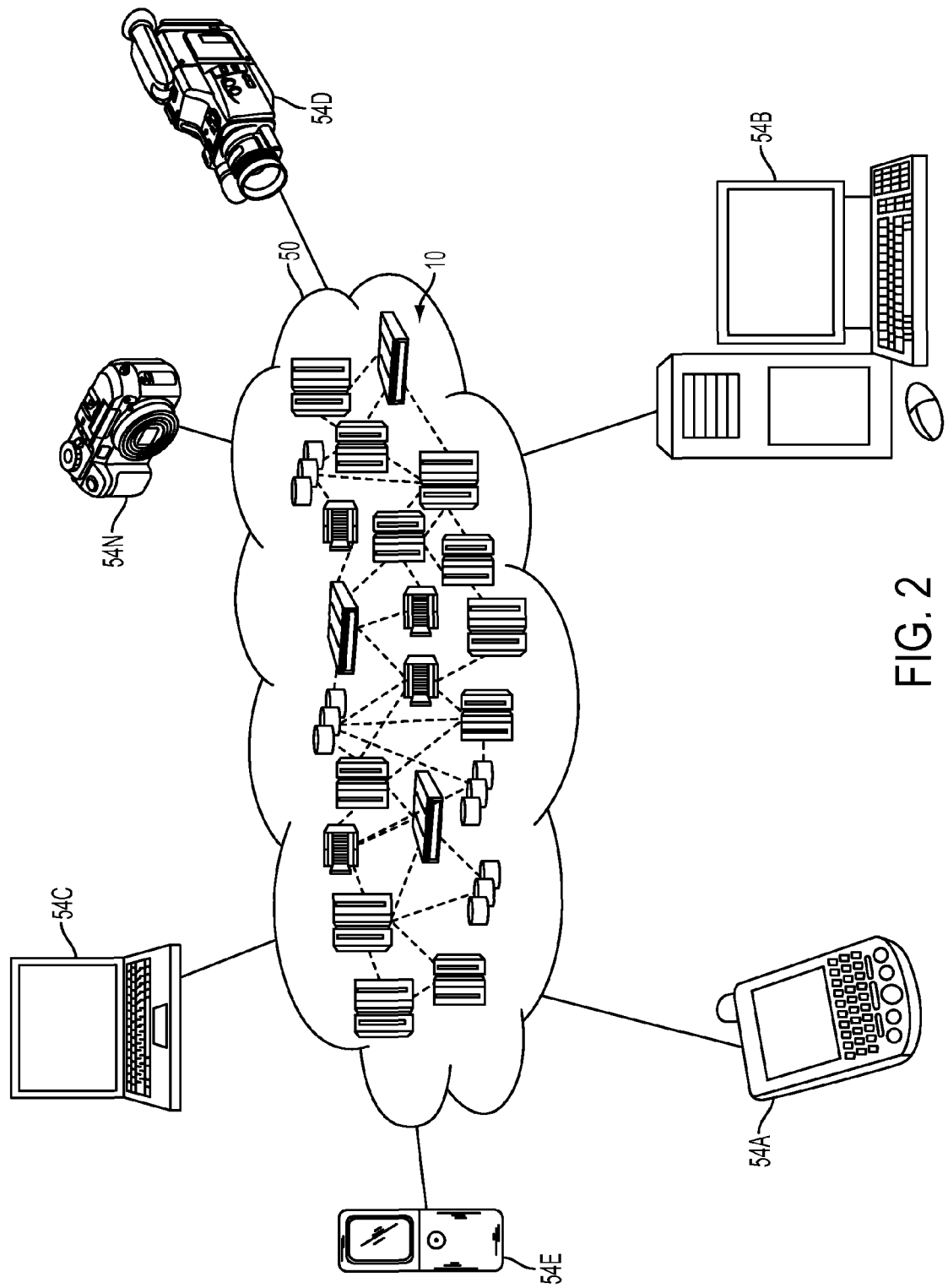
FIG. 2 depicts a cloud computing environment according to an embodiment.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, digital video camera 54D, digital audio recording device 54E, and/or digital still camera 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
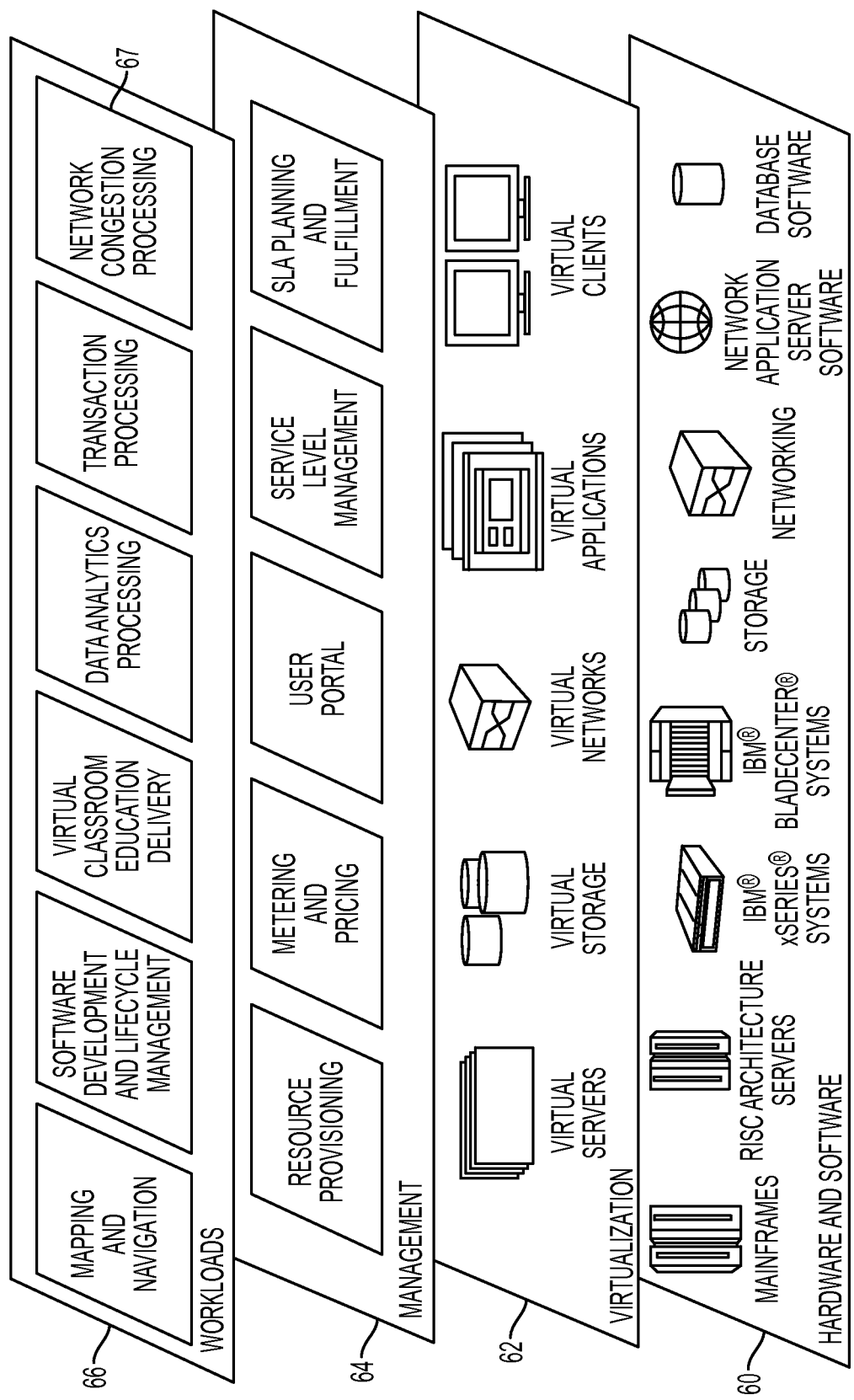
FIG. 3 depicts abstraction model layers according to an embodiment.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and network congestion processing 67.

Figure 4:
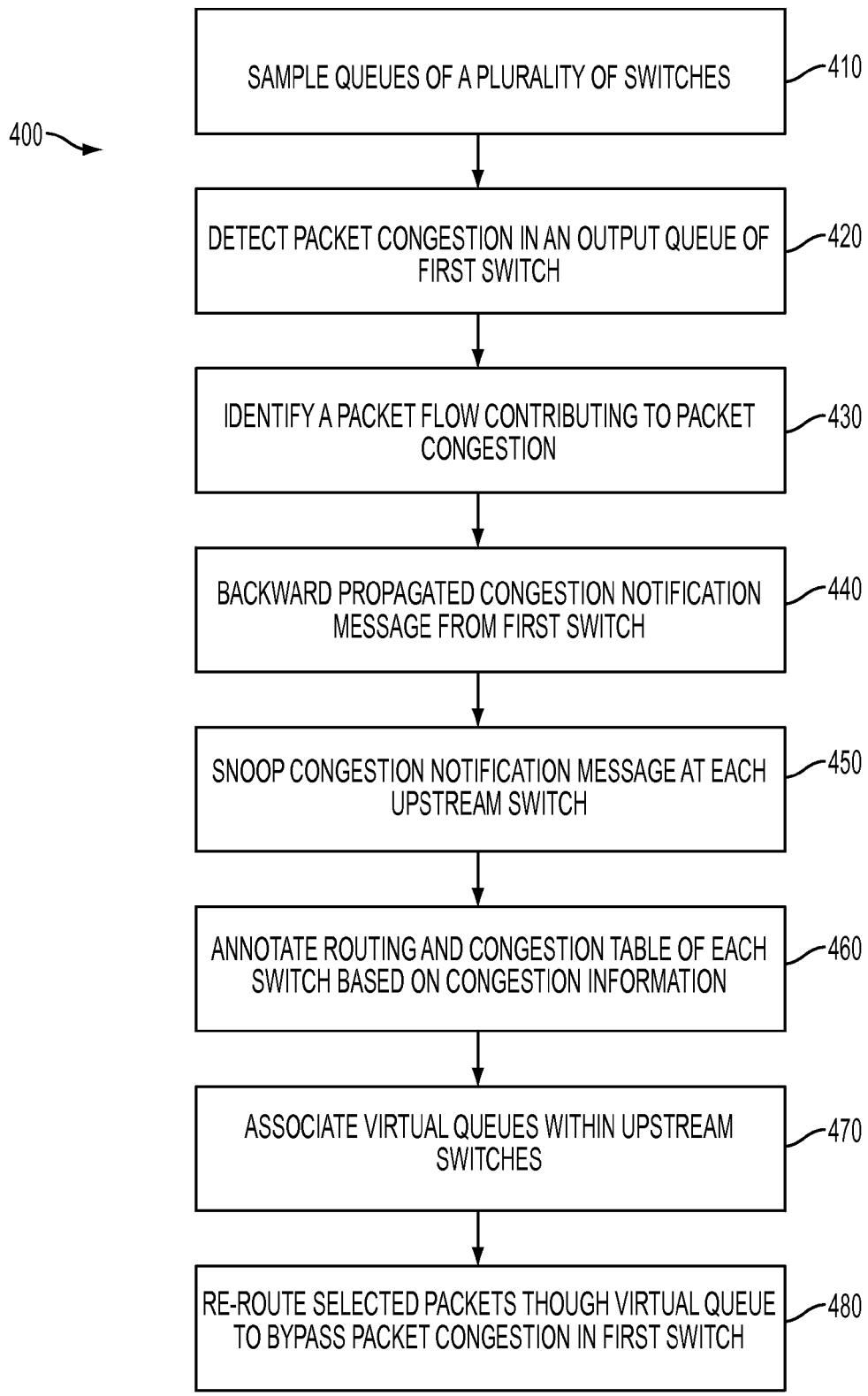
FIG. 4 depicts a flow diagram of an operation for bypassing points of congestion in a Converged Enhanced Ethernet (CEE) network according to an embodiment.

Turning now to FIG. 4, a process 400 performed by an embodiment of the network congestion processing module 67 is generally shown. As shown in FIG. 4, the process 400 bypasses points of congestion in a Converged Enhanced Ethernet (CEE) network according to an embodiment. The network may be physical or virtual and includes a plurality of switches through which packets flow between a source and destination. Additionally, each of the plurality of switches of an embodiment is enabled with a Quantized Congestion Notification (QCN) protocol and a Priority Flow Control (PFC) protocol of the lossless CEE network fabric.

In block 410, a processing device of an embodiment samples the queues of a plurality of switches in the network to detect network congestion (i.e., a hotspot). When packet congestion is detected at an output queue of a first switch in the network, as shown in block 420, the congestion information is recorded in a congestion notification message generated by the first switch. At block 430, a packet flow contributing to the packet congestion is identified. Identification may be based on, but not limited to, random sampling, arrival sampling, or occupancy sampling.

In block 440, the congestion notification message indicating the identified packet flow is generated by the first switch travels backwards from the congestion point to the sources of the packet flows contributing to the hotspot. In other words, the congestion notification message is backward propagated from the first switch through a plurality of intermediate upstream switches to the source server. According to an embodiment, the congestion notification message generated by the first switch is a QCN message. The QCN message is then transmitted to the plurality of upstream switches via Regional Explicit Congestion Notification (RECN).

In block 450, the congestion notification message is snooped at each upstream switch according to an embodiment. According to an embodiment, the congestion notification message may be a PFC frame, QCN CNM frame, or a new to-be-defined message (e.g., an Ethernet-compatible variant of a RECN message). The upstream switches that relay the congestion notification message may snoop the congestion notification message to find out about the downstream congestion and react to the downstream congestion proactively.

In block 460, a routing table and congestion table in each upstream switch is annotated based on the congestion information received from the congestion notification message. The routing table maps a destination media access control (MAC) address of each packet to a list of available ports. The routing table enables subsequent packets to be routed to a least congested port of a network based on the congestion information. By marking ports as congested with respect to specific destinations, a switch can reorder its preferences of the corresponding output ports contained in the routing table entry for that destination. Clearly, uncongested ports will be preferred over congested ones.

According to an embodiment, each switch in the network maintains a congestion information table that maps a congestion key (d, p), where d is the destination MAC address and p is the local port number, to a small data structure that keeps track of the current congestion status of port p with respect to destination d. This data structure comprises the following four fields: (i) a congested flag indicating whether congestion has been detected on port p for traffic destined to d, (ii) a local flag indicating (if congested is true) whether the congestion occurred locally (i.e., in the output queue attached to port p), (iii) a feedback counter (fbCount) indicating how many congestion notifications have been snooped for (d, p), and (iv) a feedback severity indication feedback providing an estimate of how severe the congestion is.

Whenever a switch receives or generates a congestion notification for a flow destined to d it updates the congestion information corresponding to (d, p), where p is the output port corresponding to the input port on which the congestion notification message was received (remote) or the output port that triggered the creation of the congestion notification message (local). According to an embodiment, if the entry has not been marked as congested (or did not exist yet), the congestion flag is set and local is set according to whether the congestion notification message was generated remotely or locally, fbCount is incremented, and the product of fbCount and the feedback value carried by the congestion notification message is added to feedback.

According to an embodiment, as the congestion notification messages carry negative feedback values, feedback will also be negative and decrease as more congestion notification messages are received. Therefore, the lower the value of feedback, the more severe the congestion. Embodiments employ such a weighted update to assign more weight to recent congestion notification messages to gradually reduce the effect of older entries and false positives. In addition, this allows congestion points that generate small but frequent feedback values to accumulate a significantly negative feedback value to be considered congested. This is the case for a queue in equilibrium, that is, one for which congestion is under control but load demand still exceeds link capacity. If the entry was already marked as congested then the local flag is updated only if it already was true. That is, local congestion can be overridden by remote congestion but not vice versa according to an embodiment.

In block 470, a subset of virtual queues is dynamically associated with upstream switches to hold packets associated with the identified packet flow. Accordingly, in anticipation of congestion in the network, an embodiment utilizes the virtual memory of each upstream switch to create a virtual queue holding area (i.e., a virtual storage area) to hold packets that would normally overflow. According to an embodiment, flow packets may be mapped to the virtual queues in a round-robin fashion or based on a hash key.

The newly created virtual queues prevent packet loss while subsequent packets associated with the identified packet flow reroute to an alternate route to avoid downstream congestion point, as shown in block 480. The packets associated with the identified packet flow thereby bypass the packet congestion in the first switch, according to an embodiment. In other words, selected packets are rerouted based on a specific level of the congestion status downstream, from a source through at least one enabled virtual queue bypassing the packet congestion in the first switch.

Figure 5:
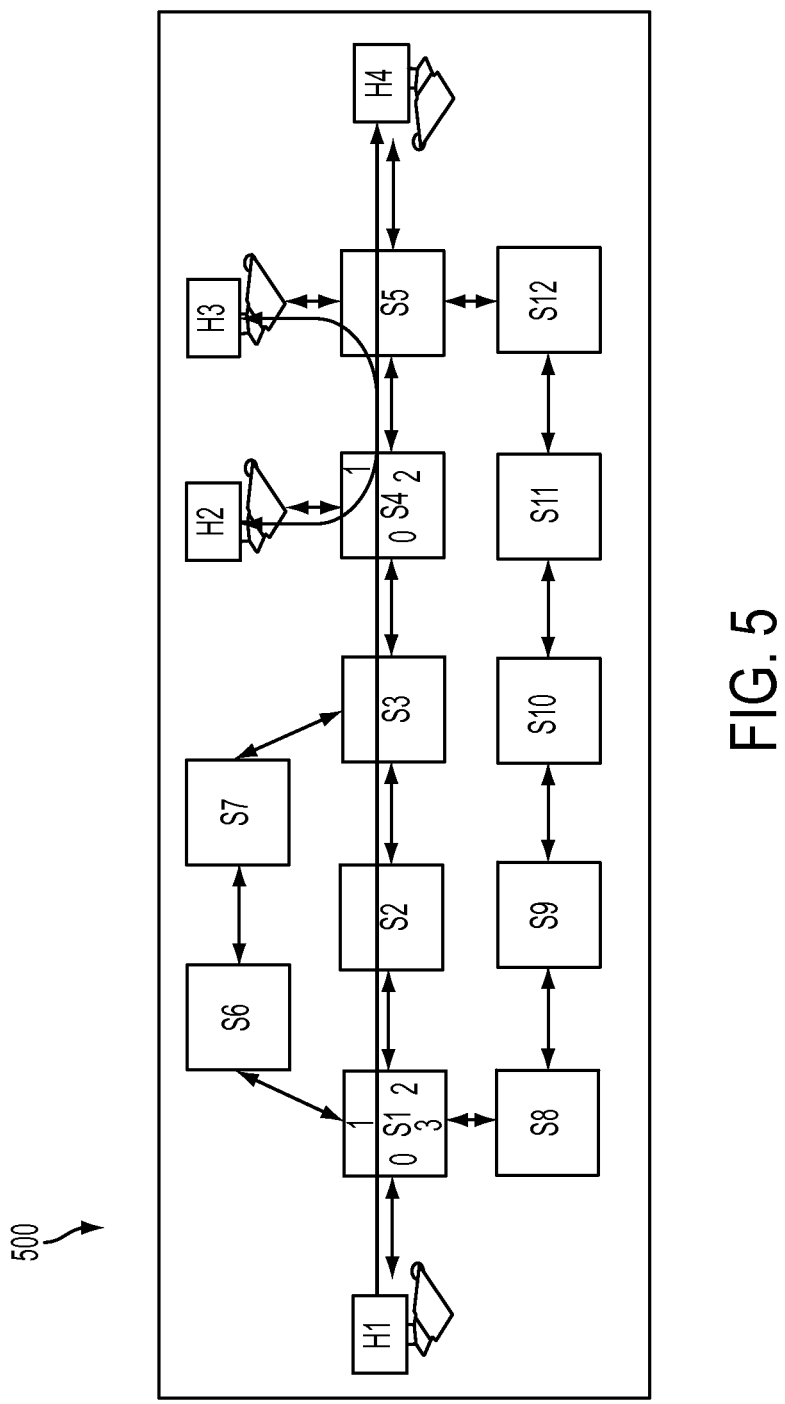
FIG. 5 depicts an example of a routing decision for packet traffic according to an embodiment.

Referring to FIG. 5, an example of a routing decision 500 for packet traffic according to an embodiment is generally shown. When a frame arrives, a switch S1 performs a routing lookup for the frame's destination MAC address d. If the default (most preferred) port p0 is not flagged as congested by the congestion table entry for (d, p0), the frame is routed to port p0. If the default port is flagged as congested, an embodiment creates a virtual queue to hold the frame as alternate ports are checked for congestion. If all ports are flagged as congested, the frame will be routed to the port with the least severe congestion (i.e., with the feedback value closest to zero).

According to an embodiment, congestion notification messages are not subjected to congestion checks. However, all ports belonging to alternative paths leading to the congestion point need to be aware of the congestion. Otherwise, if all congestion notification message frames are always routed on the same path to the reaction point (source), the flow might be rerouted on an alternative path that eventually ends up at the same congestion point. For example, in FIG. 5, both server H1 and server H2 are sending packets at line speed to server H3 and server H4, respectively, causing severe congestion at port 2 of switch S4 when the shortest paths are taken. The shortest reverse path back to server H1 is through switch S2. However, if all congestion notification messages for server H1 traverse switch S2, switch S1 will only mark its port 2 as congested, but never port 1, so switch S1 will route its traffic on the second-shortest path through port 1 to switch S6 and switch S7, still ending up at the bottleneck in switch S4.

Therefore, switch S3 should ensure that it also routes congestion notification messages on the reverse path through switches S7 and S6. Then, switch S1 will mark ports 1 and 2 as congested with respect to destination server H3, and will proceed to route its traffic through the longest path via switches S8-S12 to switch S5, thus bypassing switch S4 and eliminating the congestion.

According to another embodiment, the subset of virtual queues is dynamically allocated to flow packets according to a flexible association/mapping rule such as a round-robin allocation or an allocation based on a hash key. Because congestion notification messages only signal negative feedback (i.e., the presence or increase of congestion, but not the absence or decrease of congestion), embodiments provide a timer-based approach to expire remote entries in the congestion information table. Local entries can be expired when the corresponding output queue is no longer congested. According to an embodiment, whenever an entry is updated as being congested, a timer is started. When the timer expires the entry is reset, provided that it is not flagged as local. A local entry is reset when the length of the corresponding output queue drops below an equilibrium threshold.

According to another embodiment, the switches in the network may be under the control of a central software-defined networking (SDN) controller. SDN is a form of network virtualization in which the control plane is separated from the data plane and implemented in a software application. This architecture allows network administrators to have programmable central control of network traffic without requiring physical access to the network's hardware devices. OpenFlow is an example of an enabler of SDN that gives access to the forwarding plane of a network switch or router over the network. The central SDN controller of an embodiment receives messages from all the switches in the network and provides instructions to each switch regarding the creation of virtual queue and the routing of packet traffic according to an embodiment. The central SDN controller overlooks an entire network and may activate a selection of switches at a particular moment in time.

Embodiments disclosed herein provide the technical effects and benefits of detecting and handling network congestion in a lossless Ethernet fabric. Embodiments empower switches upstream from the network congestion to proactively create virtual queues and re-route packet traffic to bypass downstream congestion points to get better throughput on the network and better performance for attached applications.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for bypassing congestion points in a network, the method comprising:
    sampling, by a processing device, queues of a plurality of switches in a network;
    detecting packet congestion in a congestion point of a first switch;
    identifying a packet flow contributing to the packet congestion, the identifying based on random sampling or occupancy sampling;
    propagating a congestion notification message indicating the identified packet flow to upstream switches, the upstream switches including switches that are upstream from the first switch in the network;
    snooping the congestion notification message at the upstream switches;
    dynamically associating virtual queues within the upstream switches to hold packets associated with the identified packet flow, wherein the subset of virtual queues is allocated to the packet traffic intended for the packet congestion in a round robin fashion; and
    re-routing packets associated with the identified packet flow, thereby bypassing the packet congestion in the first switch.

2. The computer-implemented method of claim 1, wherein the switches comprise routing tables that map a destination media access control (MAC) address of each packet to a list of available ports, the routing table enabling subsequent packets to be routed to a least congested port of a network based on received congestion information.

3. The computer-implemented method of claim 2, wherein the routing table is updated based on the congestion notification message.

4. The computer-implemented method of claim 1, wherein the switches comprise congestion tables for tracking points of congestion, the congestion tables mapping a congestion key, which includes a destination MAC address and a local port number, to a congestion entry data structure.

5. The computer-implemented method of claim 1, wherein the subset of virtual queues are dynamically allocated to flow packets according to a mapping rule.

6. The computer-implemented method of claim 1, wherein
    the plurality of switches in the network is enabled with a Quantized Congestion Notification (QCN) protocol and a Priority Flow Control (PFC) protocol;
    the congestion notification message generated by the first switch is a QCN message, the QCN congestion notification message being transmitted to upstream switches; and
    the re-routing of selected packets is based on a downstream congestion status.

7. A computer program product for bypassing congestion points in a network, the computer program product comprising:
- a non-transitory computer readable storage medium having program code embodied therewith, the program code executable by a processing device for:
- sampling queues of a plurality of switches in a network;
- detecting packet congestion in a congestion point of a first switch;
- identifying a packet flow contributing to the packet congestion, the identifying based on random sampling or occupancy sampling;
- propagating a congestion notification message indicating the identified packet flow to upstream switches, the upstream switches including switches that are upstream from the first switch in the network;
- snooping the congestion notification message at the upstream switches;
- dynamically associating virtual queues within the upstream switches to hold packets associated with the identified packet flow, the packets associated with the identified flow assigned to the virtual queues based on a hash key;
- and re-routing packets associated with the identified packet flow, thereby bypassing the packet congestion in the first switch.

8. The computer program product of claim 7, further comprising a routing table in each switch that maps a destination media access control (MAC) address of each packet to a list of available ports, the routing table enabling subsequent packets to be routed to a least congested port of a network based on received congestion information.

9. The computer program product of claim 8, wherein the routing table is updated based on the congestion notification message.

10. The computer program product of claim 7, further comprising a congestion table in each switch for tracking points of congestion, the congestion table mapping a congestion key, which includes a destination MAC address and a local port number, to a congestion entry data structure.

11. The computer program product of claim 7, wherein the subset of virtual queues are dynamically allocated to flow packets according to a mapping rule.

12. The computer program product of claim 7, wherein
- the plurality of switches in the network is enabled with a Quantized Congestion Notification (QCN) protocol and a Priority Flow Control (PFC) protocol;
- the congestion notification message generated by the first switch is a QCN message, the QCN congestion notification message being transmitted to upstream switches; and
- the re-routing of selected packets is based on a downstream congestion status.

* * * * *